(12) United States Patent
Mehas et al.

(10) Patent No.: US 9,991,818 B2
(45) Date of Patent: Jun. 5, 2018

(54) APPARATUSES AND RELATED METHODS FOR A WIRELESS POWER RECEIVER USING COUPLED INDUCTORS

(71) Applicant: Integrated Device Technology, Inc., San Jose, CA (US)

(72) Inventors: Gustavo J. Mehas, Mercer Island, WA (US); Anthonius Bakker, Morgan Hill, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 169 days.

(21) Appl. No.: 14/670,385

(22) Filed: Mar. 26, 2015

(65) Prior Publication Data
US 2016/0285279 A1 Sep. 29, 2016

(51) Int. Cl.
| H01F 27/42 | (2006.01) |
| H01F 37/00 | (2006.01) |
| H01F 38/00 | (2006.01) |
| H02M 7/23 | (2006.01) |
| H02J 50/10 | (2016.01) |

(52) U.S. Cl.
CPC ............... *H02M 7/23* (2013.01); *H02J 50/10* (2016.02)

(58) Field of Classification Search
CPC ..................... Y02B 70/1433; Y02B 70/1411
See application file for complete search history.

(56) References Cited

U.S. PATENT DOCUMENTS

| 9,191,075 | B2* | 11/2015 | Jung ................... H04B 5/0037 |
| 2005/0063488 | A1* | 3/2005 | Troyk ................. G06K 7/0008 375/316 |
| 2012/0286582 | A1* | 11/2012 | Kim ....................... H02J 5/005 307/104 |
| 2013/0257360 | A1 | 10/2013 | Singh |
| 2013/0260676 | A1 | 10/2013 | Singh |
| 2013/0314035 | A1* | 11/2013 | Kohlschmidt .......... H02J 7/025 320/108 |
| 2015/0028691 | A1* | 1/2015 | Yamauchi ............... H02J 5/005 307/104 |
| 2015/0333530 | A1* | 11/2015 | Moyer .................... H02J 7/025 307/104 |

* cited by examiner

*Primary Examiner* — Jared Fureman
*Assistant Examiner* — Esayas Yeshaw
(74) *Attorney, Agent, or Firm* — Haynes and Boone, LLP

(57) ABSTRACT

A wireless power enabled apparatus includes a wireless power receiver. The wireless power receiver includes one or more receive coils configured to generate an AC power signal responsive to a wireless power signal. The wireless power receiver also includes two or more inductors configured with tightly coupled windings that share a common leakage inductance. Switching circuits are included such that each switching circuit is operably coupled to a corresponding one of the inductors. Control logic is configured to operate switches of the switching circuits such that each of the switching circuits and its corresponding two or more inductors are operated to shift between an energy storage mode for one or more phases of a switching period and an energy transfer mode for other phases of the switching period and the phases combine to comprise an entirety of the switching period.

23 Claims, 4 Drawing Sheets

APPARATUSES AND RELATED METHODS FOR A WIRELESS POWER RECEIVER USING COUPLED INDUCTORS

FIELD

Embodiments of the present disclosure relate generally to wireless power transfer and, more particularly, to apparatuses and related methods for wireless power receivers.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space and one needs to find a suitable outlet for the adaptor. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other.

BRIEF SUMMARY

Embodiments of the present disclosure include a wireless power receiver including one or more receive coils configured to generate an AC power signal responsive to a wireless power signal. The wireless power receiver also includes two or more inductors configured with tightly coupled windings that share a common leakage inductance. Two or more switching circuits are included such that each switching circuit is operably coupled to a corresponding one of the two or more inductors. Control logic is configured to operate switches of the two or more switching circuits such that each of the two or more switching circuits and its corresponding one of the two or more inductors are operated to shift between an energy storage mode for one or more phases of a switching period and an energy transfer mode for other phases of the switching period and the phases combine to comprise an entirety of the switching period.

Embodiments of the present disclosure also include a wireless power enabled apparatus with a wireless power receiver including one or more receive coils configured to generate an AC power signal responsive to a wireless power signal. Two or more switched inductor circuits are operably coupled to the one or more receive coils and each switched inductor circuit includes an inductor and two or more switches operably coupled to the inductor. Control logic is configured to operate the two or more switches such that the two or more switches and the inductor are operated to shift between an energy storage mode for one or more phases of a switching period and an energy transfer mode for other phases of the switching period and the phases combine to comprise an entirety of the switching period. The inductors from each of the two or more switched inductor circuits include tightly coupled windings that share a common leakage inductance.

Other embodiments of the present disclosure include a method of operating a receiver side of a wireless power transfer system. The method includes generating an AC power signal responsive to a wireless power signal exciting one or more receive coils at a given frequency. Each of two or more switched inductor circuits are operably coupled to the one or more receive coils and are operated to shift between an energy storage mode for one or more phases of a switching period and an energy transfer mode for other phases of the switching period and the phases combine to comprise an entirety of the switching period. The inductors from each of the two or more switched inductor circuits include tightly coupled windings that share a common leakage inductance.

DETAILED DESCRIPTION

Figure 1:
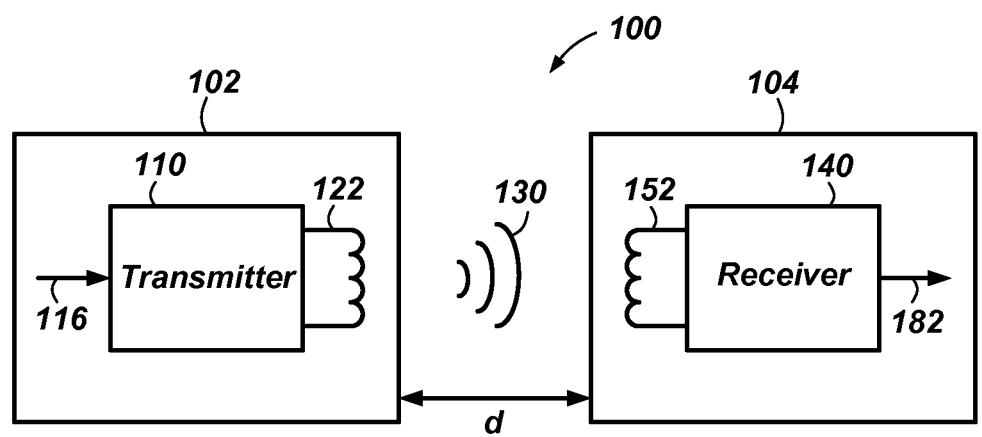
FIG. 1 is a schematic block diagram of a wireless power transfer system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Figure 3:
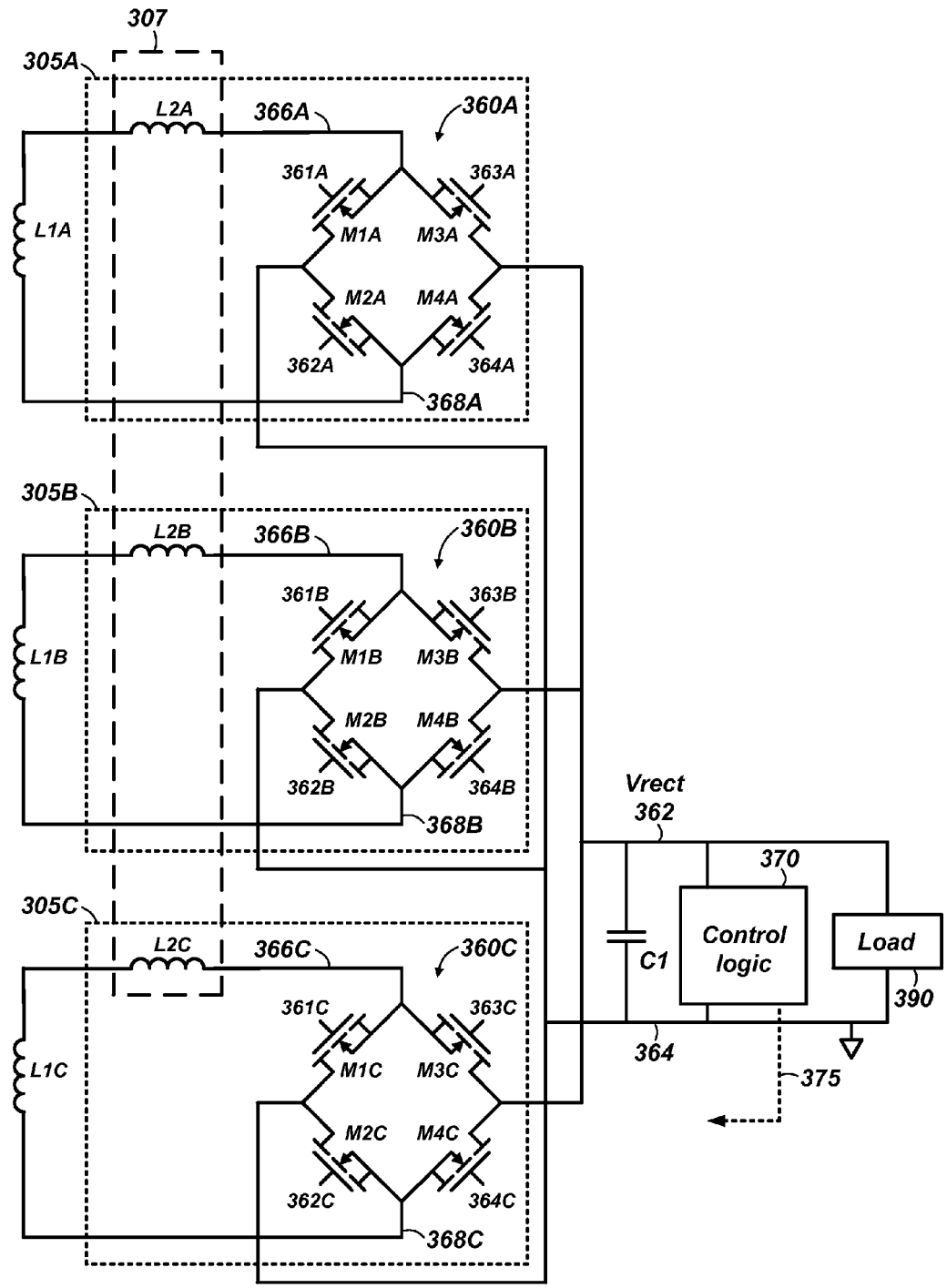
FIG. 3 is a detailed schematic block diagram illustrating a wireless power receiver in a configuration including coupled inductors.

When describing circuit elements, such as, for example, resistors, capacitors, and transistors, designators for the circuit elements begin with an element type designator (e.g., R, C, M) followed by a numeric indicator. Circuit element numbers may be repeated on different drawings and are not to be considered the same element unless expressly indicated as such. In other words, a capacitor C1 on FIG. 3 is a different element from a capacitor C1 on FIG. 4. Power sources such as, for example VDD and VCC as well as ground voltages may be generically indicated. When appropriate, these power signals may be described in detail. In other cases, the power signals may not be described, as it would be apparent to a person of ordinary skill in the art which power signal should be used. As a non-limiting example, it may be appropriate to maintain separate analog and digital grounds and a person of ordinary skill in the art would understand which is the appropriate ground for a specific circuit.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

It should be recognized that the devices of a wireless power transfer system are described herein primarily with respect to functionality of wireless power transfer; however, it should be recognized that the wireless power transfer system may include additional components to perform other features not specifically described herein or shown in the various figures, such as, for example, communication. As other examples, wireless power enabled devices may include foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to modulate the power generated by the wireless power receiver.

FIG. 1 is a schematic block diagram of a wireless power transfer system 100. The wireless power transfer system 100 includes a wireless power transmitting apparatus 102, and a wireless power receiving apparatus 104. The wireless power transmitting apparatus 102 includes a wireless power transmitter 110 having a transmit coil 122 configured to generate a wireless power signal 130 (e.g., electric field, magnetic field, electromagnetic field, etc.) for providing power transfer to the wireless power receiving apparatus 104. The wireless power receiving apparatus 104 includes a wireless power receiver 140 having a receive coil 152 configured to electromagnetically couple with the wireless power signal 130. The transmit coil 122 and the receive coil 152 may be sized according to the particular devices and applications to be associated therewith.

An input signal 116 may be provided to the wireless power transmitter 110 for generating the wireless power signal 130 that provides a power transfer to the wireless power receiving apparatus 104. The wireless power receiver 140 may couple to the wireless power signal 130 and may generate an output voltage 182 in response thereto. The output voltage 182 may provide the power that is used by the wireless power receiving apparatus 104 for storing (e.g., charging a battery), consumption (e.g., providing system power), or a combination thereof.

The wireless power transmitter 110 and the wireless power receiver 140 are separated by a distance (d). In some embodiments, the wireless power transmitter 110 and the wireless power receiver 140 may be configured according to a mutual inductance relationship, such that when the resonant frequency of the wireless power receiver 140 and the resonant frequency of the wireless power transmitter 110 are substantially identical, transmission losses between the wireless power transmitter 110 and the wireless power receiver 140 are minimal. Likewise, the frequency of the wireless power signal 130 may be set by the wireless power transmitter 110 at a given frequencies of the coils 122, 152. In some embodiments, the frequency of the wireless power signal 130 may be set at or near the resonant frequency of the coils 122, 152. In some embodiments, the frequency of the wireless power signal 130 may be sent at another frequency, such as a frequency that is slightly lower than the resonant frequency of the coils 122, 152. An effective power transfer may occur by coupling a large portion of the energy in the near-field of the transmit coil 122 to the receive coil 152 rather than propagating most of the energy in a wave to the far-field. If the wireless power receiving apparatus 104 is in the near-field (within some distance (d)), inductive coupling may occur between the transmit coil 122 and the receive coil 152. The area around the transmit coil 122 and the receive coil 152 where this near-field inductive coupling may occur may be referred to as a "coupling region." Because of this mutual inductance relationship, the wireless power transfer may be referred to as inductive wireless power transfer.

The transmit coil 122 and the receive coil 152 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 152 within a plane of the transmit coil 122 where the coupling region of the transmit coil 122 may be more powerful.

The wireless power receiving apparatus 104 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which the wireless power signal 130 may be received. The wireless power receiving apparatus 104 may also be a less mobile electronic device, such as a television, personal computer, media player (e.g., DVD player, Blu-ray player, etc.) or any other device that may operate by, and/or store electrical power. The wireless power receiving apparatus 104 may be one of a number of other items, such as an automobile or any other devices that may include batteries that may be charged through the wireless power transmitting apparatus 102.

The wireless power transmitting apparatus 102 may be a device that may, at times, also be the recipient of wireless power transfer. In other words, some devices may be configured with both the wireless power transmitting apparatus 102 and the wireless power receiving apparatus 104, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter. Moreover, either of the wireless power transmitting apparatus 102 and the wireless power receiving apparatus 104 may be referred to herein as a wireless power enabled apparatus or a wireless power enabled device.

Figure 2:
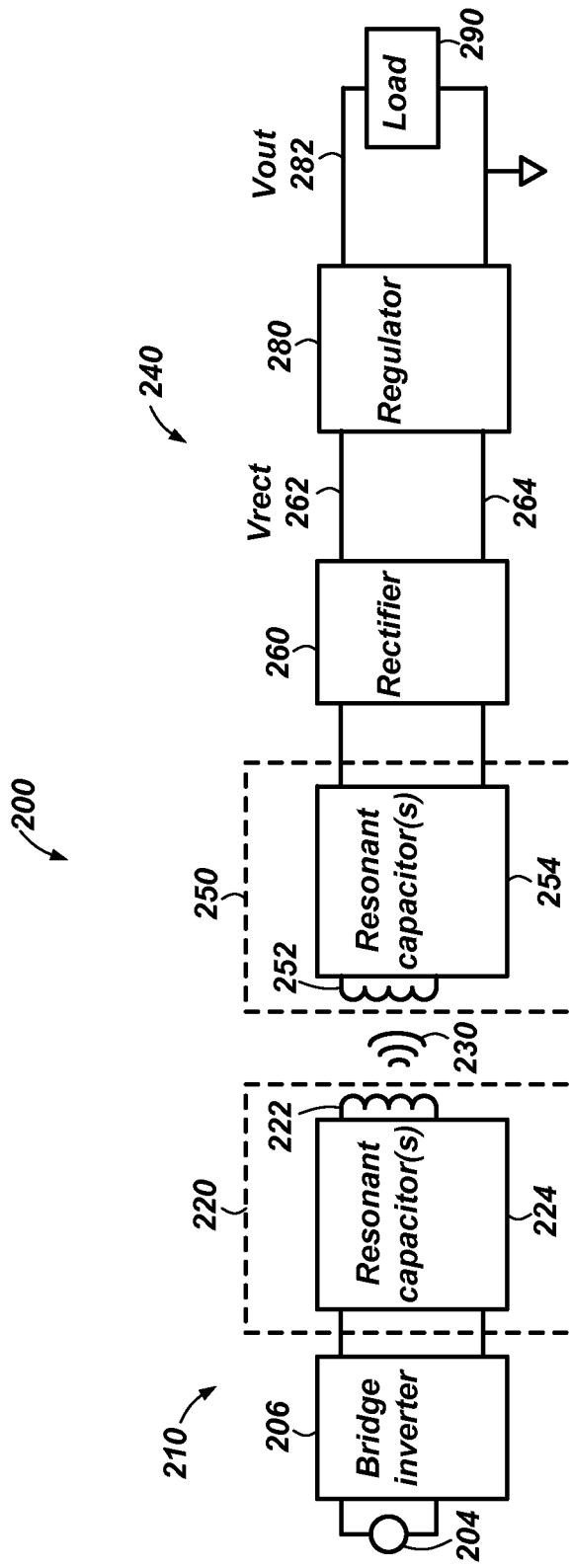
FIG. 2 is a more detailed schematic block diagram of a wireless power transfer system.

FIG. 2 is a more detailed schematic block diagram of a wireless power transfer system 200. The wireless power transfer system 200 includes a wireless power transmitter 210 and a wireless power receiver 240. The wireless power transmitter 210 and the wireless power receiver 240 may be configured to couple with each other according to a mutual inductance relationship such that wireless power signal 230 may be transferred from the wireless power transmitter 210 to the wireless power receiver 240.

The wireless power transmitter 210 may include a transmit resonant tank 220, a bridge inverter 206, and control logic (not shown) coupled together to generate the wireless power signal 230 transmitted to the wireless power receiver 240. The transmit resonant tank 220 may include a transmit coil 222 coupled with one or more transmit resonant capacitors 224. The bridge inverter 206 of the wireless power transmitter 210 may include a full bridge inverter, a half bridge inverter, or other appropriate circuit for receiving a DC input signal 204 and generating an AC signal through the transmit coil 222 for generating the wireless power signal 230.

The wireless power receiver 240 includes a receive resonant tank 250, a rectifier 260 configured to generate a DC rectified power signal (Vrect) 262 responsive to the wireless power transfer. The wireless power receiver 240 may also include a regulator 280. The regulator 280 may generate an output voltage ($V_{OUT}$) 282 in response to the DC rectified power signal (Vrect) 262 from the rectifier 260. The output voltage 282 may be provided to a load 290 (e.g., a battery, system components, etc.). The output voltage 282 may also be referred to herein as an output power signal 282 carrying the output voltage 282. The receive resonant tank 250 may include the receive coil 252 coupled with one or more receive resonant capacitors 254. The wireless power transmitter 210 and the wireless power receiver 240 may be incorporated within a wireless power transmitting apparatus 102 (FIG. 1) and a wireless power receiving apparatus 104 (FIG. 1), respectively. The transmit coil 222 and the receive coil 252 (and other components) may be sized according to the particular devices and applications to be associated therewith.

The wireless power transmitter 210 and the wireless power receiver 240 may be generally configured as discussed above with respect to FIG. 1. The configurations of the LC networks within the transmit resonant tank 220 and the receive resonant tank 250 may generally determine the resonant frequencies of the wireless power transmitter 210 and the wireless power receiver 240, respectively. For example, the resonant frequency of the resonant tanks (220, 250) may be based on the inductance of their respective inductive coil (222 and 252) and the capacitance of the resonant capacitors (224 and 254).

During wireless power transmission, the DC input signal 204 may be received by the bridge inverter 206. The bridge inverter 206 may generate an AC current that flows through the transmit resonant tank 220 to generate a time-varying signal for transmitting the wireless power signal 230. Thus, the wireless power signal 230 may be a time-varying signal that is substantially sinusoidal, having a frequency that may be based on the switching frequency of the bridge inverter 206 of the wireless power transmitter 210. In some embodiments, the frequency of the wireless power signal 230 may be set according to a desired frequency, such as a frequency for a particular wireless power standard. The transmit resonant tank 220 may be configured such that the resonant frequency is approximately the frequency of the wireless power signal 230. In some embodiments, it may be desirable for the frequency of the wireless power signal 230 to differ somewhat from the resonant frequency of the transmit resonant tank 220, such as to reduce the peak-to-peak current through the transmit coil 222.

In order to receive the wireless power signal 230, the wireless power receiver 240 may be placed in the coupling region of the wireless power transmitter 210 such that coupling (e.g., inductive, magnetic, or a combination thereof) coupling may be achieved. As a result, the wireless power receiver 240 may receive the wireless power signal 230 and generate an AC power responsive thereto. In order for the power to be used by the load 290, the AC power may be converted to a DC power. The rectifier 260 may generate a rectified voltage 262 as well as a rectified current ($I_{RECT}$) flowing through the receive resonant tank 250.

Embodiments of the present disclosure combine switched inductor circuits with inductors that are coupled together and combined with wireless power receive topologies. The combination of a coupled inductor topology in the wireless power receiver 240 allows for reduction of losses, which improves receive efficiency.

In one topology, the receive coil 252 may be configured to have N parallel windings all of which share the receive leakage inductance, which effectively turns the receive coil 252 into a coupled inductor. By reducing the number of turns of the receive coil 252, a multi-phase coupled boost can be created utilizing a full bridge rectifier for each phase. This novel approach allows for almost no ripple in the boost regulator at optimal duty ratios. In addition, this boost regulator topology can be configured to operate at a higher frequency than the fundamental wireless power transfer frequency. At this higher frequency of operation, the wireless power receiver 240 can adjust its current draw dynamically, creating a power transfer factor close to unity. This near-unity power transfer factor may increase efficiency over traditional peak or constant current implementations. Additional details on this topology are discussed below with reference to FIG. 3.

In another topology, a full bridge rectifier may be used as an input stage to phased buck regulators with N-phase coupled output inductors. The number of phases may be chosen to allow for almost perfect ripple cancellation in the output stage using traditional receive full bridge rectification control. Additional details on this topology are discussed below in combination with FIG. 4.

A coupled inductor can be represented as a set of tightly coupled windings that all share a single common leakage inductance (not to be confused with a magnetization inductance). As the current in any given winding is directly proportional to the energy stored in the leakage inductance of the inductor, a perfect coupled inductor would have the same and identical amount of current in each of its windings regardless of the voltage across any given winding. As such, if any given phase of a coupled inductor has a positive voltage across the winding, energy is stored in the shared leakage inductance, and if the total energy in the leakage inductance increases all phases see a resulting increase in current. Likewise, any phase that has a negative voltage across it extracts energy from the shared leakage inductance causing a decrease in overall current in all of the windings if the total energy in the leakage inductance increases.

If the N phases are offset in time, the current waveform in each phase appears to have an AC ripple frequency N times higher than the fundamental switching frequency of the system. A special case can occur when the on time of each phase is equal to the inverse (1/N) of the number of phases or one minus the inverse (1−1/N), such as a 0.25 or a 0.75 duty cycle in a four-phase system. In an example of a four-phase case with a 0.25 duty cycle, the amount of energy being transferred into shared leakage inductance by one of the phases is equal to the amount of energy being extracted by the other phases, resulting in substantially zero AC current ripple in all phases. This reduced ripple in all phases may result in significant efficiency improvements relative to high ripple systems. In practical implementation there are real magnetization and secondary non-shared leakage inductances which cause non-ideal performance. However, embodiments of the present disclosure provide enough benefits to achieve efficiency improvements.

FIG. 3 is a schematic block diagram illustrating a wireless power receiver in a configuration including coupled inductors. In this configuration, a three phase system is shown as an example to discuss details. Of course, other embodiment may include any reasonable number of N phase systems. In general, it may be desirable to have fewer phases to conserve space chip, while still generating enough current for the particular implementation. Embodiments that require higher current (e.g., server systems) may scaled to have more phases (e.g., 4 or more). Thus, while the discussion below refers to embodiments with three phases, it should be understood that the systems may be scaled such that additional phases are also contemplated within embodiments of the disclosure.

Each phase includes a receive coil (L1A, L1B, L1C) coupled with a corresponding switched inductor circuit (305A, 305B, 305C). Other components may be associated with the receive coils (L1A, L1B, L1C), such as, for example, the resonant capacitors 254 shown in FIG. 2.

The switched inductor circuits (305A, 305B, 305C) each include an inductor (L2A, L2B, L2C) coupled in series between the receive coils (L1A, L1B, L1C) and a switching circuit (360A, 360B, 360C) configured as a switching bridge rectifier (360A, 360B, 360C). For example, a first switched inductor circuit 305A includes an inductor L2A, which is coupled in series between the first receive coil L1A and the first switching circuit 360A. Similarly, a second switched inductor circuit 305B includes an inductor L2B, which is coupled in series between the second receive coil L1B and the second switching circuit 360B. A third switched inductor circuit 305C includes an inductor L2C, which is coupled in series between the third receive coil L1C and the third switching circuit 360C.

The inductors (L2A, L2B, L2C) are configured as tightly coupled windings 307 as discussed above. In some embodiments, each of the receive coils (L1A, L1B, L1C) may be combined with its corresponding inductor (L2A, L2B, L2C) to create three combined coils with tightly coupled windings 307. In descriptions herein, reference may be made to a coil set. A coil set should be interpreted as the receive coil and the inductor combined in tightly coupled windings 307 with the other coil sets. Alternatively, a coil set may be a series combination of the receive coil and the inductor where the inductor portion is combined in tightly coupled windings 307 with the other inductors from the other coil sets.

Each of the switching bridge rectifiers (360A, 360B, 360C) include a first transistor (M1A, M1B, M1C) controlled by a first control signal (361A, 361B, 361C), a second transistor (M2A, M2B, M2C) controlled by a second control signal (362A, 362B, 362C), a third transistor (M3A, M3B, M3C) controlled by a third control signal (363A, 363B, 363C), and a fourth transistor (M4A, M4B, M4C) controlled by a fourth control signal (364A, 364B, 364C).

Positive outputs of the switching bridge rectifiers (360A, 360B, 360C) are coupled together to form a DC rectified power signal 362 and negative outputs are coupled together to form a rectified ground 364. A filter capacitor C1 may be included between the positive and negative outputs to filter variations in the DC rectified power signal 362.

Control logic 370 is included to provide control signals 375 (individually referred to as 361A, 362A, 363A, 364A, 361B, 362B, 363B, 364B, 361C, 362C, 363C, and 364C) to control the various transistors to perform the rectifying functions as well as control a multi-phase system (e.g., a three phase system) wherein the phases combine to define a switching period. The discussion of this example assumes equal phases (e.g., each phase is one-third of the switching period in a three phase system). However, the number of phases may be varied and embodiments may also be used with different phase times for the different phases. Moreover, the different phase times may be modified to set a voltage for the DC rectified power signal 262 to a voltage suitable for driving a load 390 of an electronic device (not shown). In some embodiments, an additional regulator (not shown) may be included to modify the voltage and provide power to the load 390 with an output voltage separate from the DC rectified power signal 262.

The following description is intended as a general description of an example of how this circuitry may be switched; however, it is contemplated that alternate switching patterns and control levels may be used depending on the desired end switching characteristics and output voltage requirements. In operation, begin by assuming the system is in a state where the voltage is positive between a first coil node (366A, 366B, 366C) and a second coil node (368A, 368B, 368C) for each of the switched inductor circuits (305A, 350B, 305C). Also assume that this voltage across the coil nodes is about ⅔ of the voltage between the DC rectified power signal 362 and the rectified ground 364. As an example, a switching period may be defined as about 900 nanoseconds, with 300 nanoseconds for each phase of a three-phase system.

In a first state, transistors M2A, M2B, and M2C are turned on connecting the rectified ground 364 to each of the second coil nodes (368A, 368B, 368C).

In a second state, transistors M1A, M1B, and M1C are turned on at substantially the same time, which effectively closes a circuit with the receive coils (L1A, L1B, L1C) and the inductors (L2A, L2B, L2C). In other words, this closed circuit effectively shorts the receive coils (L1A, L1B, L1C) and the inductors (L2A, L2B, L2C) and their respective leakage inductances through their respective transistors.

In a third state at the beginning of a first phase, once the current in the inductors (L2A, L2B, L2C) reach a target threshold, transistors M1A and M1B in switching bridge rectifiers 360A and 360B, respectively are turned off. At substantially the same time, transistor M3A and M3B in switching bridge rectifiers 260A and 360B are turned on.

As a result, in a fourth state energy stored in receive coil L1A and inductor L2A is transferred to the DC rectified power signal 362, and energy stored in receive coil L1B and inductor L2B is also transferred to the DC rectified power signal 362. In addition, during this phase receive coil L1C and inductor L2C continue to store energy.

In a fifth state at the beginning of a second phase, transistors M3A and M1C are turned off and transistors M1A and M3C are turned on. As a result, receive coil L1A and inductor L2A transition to an energy storage mode, while receive coil L1C and inductor L2C transition to an energy transfer mode transferring their energy to the DC rectified power signal 362. Receive coil L1B and inductor L2B remain in an energy transfer mode during this second phase.

In a sixth state at the beginning of a third phase, transistors M1A and M3B are turned off and transistors M3A and M1B are turned on. As a result, receive coil L1A and inductor L2A return to an energy transfer mode, while receive coil L1B and inductor L2B transition to an energy storage mode transferring their energy to the DC rectified power signal 362. Receive coil L1C and inductor L2C remain in an energy transfer mode during this third phase.

In a seventh state at the end of the third phase, transistors M1B and M3C are turned off and transistors M1C and M3B are turned on. As a result, receive coil L1C and inductor L2C return to an energy storage mode, while receive coil L1B and inductor L2B transition to an energy transfer mode transferring their energy to the DC rectified power signal 362. Receive coil L1A and inductor L2A remain in an energy transfer mode. This effectively returns the system to the fourth state at the beginning of the first phase.

In summary, during the first phase, switched inductor circuits 305A and 305B are in an energy transfer mode while switched inductor circuit 305C is in an energy storage mode. During the second phase, switched inductor circuits 305B and 305C are in an energy transfer mode while switched inductor circuit 305A is in an energy storage mode. During the third phase, switched inductor circuits 305A and 305C are in an energy transfer mode while switched inductor circuit 305B is in an energy storage mode.

This cycle of the three phases repeats until the voltage across the coils (L1A, L1B, L1C) begins to drop due the AC nature of the power transfer caused by the wireless power signal 230 (FIG. 2). When the voltage across the coils (L1A, L1B, L1C) inverts, the system repeats the process with the opposite polarities and controlling the bottom transistors (M2A, M4A, M2B, M4B, M2C and M4C) of the switching bridge rectifiers (360A, 360B, 360C).

With any of the phases, because one of the switched inductor circuits (305A, 305B, 305C) is in an energy storage mode while the other two are in energy transfer modes, and the inductors L2A, L2B, and L2C are coupled inductors with tightly coupled windings 307, some portion (e.g., about 80%) of the energy being stored in the energy storage mode inductor is transferred to the other inductors in the energy transfer mode.

Voltage regulation may be maintained by communicating back to the transmitter 210 (FIG. 2) to set the correct coil voltage (e.g., as existing wireless power protocols define). In some embodiments, the control logic 370 may omit an energy transfer cycle, effectively current starving the DC rectified power signal 362, with the side effect of increasing the current ramp up in the coils. In some embodiments, voltage regulation may be maintained by employing PWM techniques to regulate the output voltage.

Any residual current in the coils (L1A, L1B, L1C, L2A, L2B, and L2C) from a previous cycle can effectively be reset by states one, two, and three as discussed above.

A relationship of coil voltage to output voltage of about ⅔ correlates with the above ratio of 2 coil sets transferring energy while one coil set stores energy. Were the coil voltages ⅓, 1 coil set would transfer energy while two coil sets store energy. Ideally (i.e., 100% coupling) in this configuration the currents in the three coil sets would always stay at the threshold current and would never change. Practically, however, due to imperfect coupling, a round robin methodology may be used to keep currents in each loop balanced. In such a case, the control loop for the round robin state change may be set by time, but it could be also set by current in a given loop as well.

As the coil voltage changes in a sinusoidal manner the on and off times of the various transistors as well as the targeted threshold current can be changed to achieve optimal power transfer (similar in concept to an optimal power factor waveform in AC to DC converters).

Figure 4:
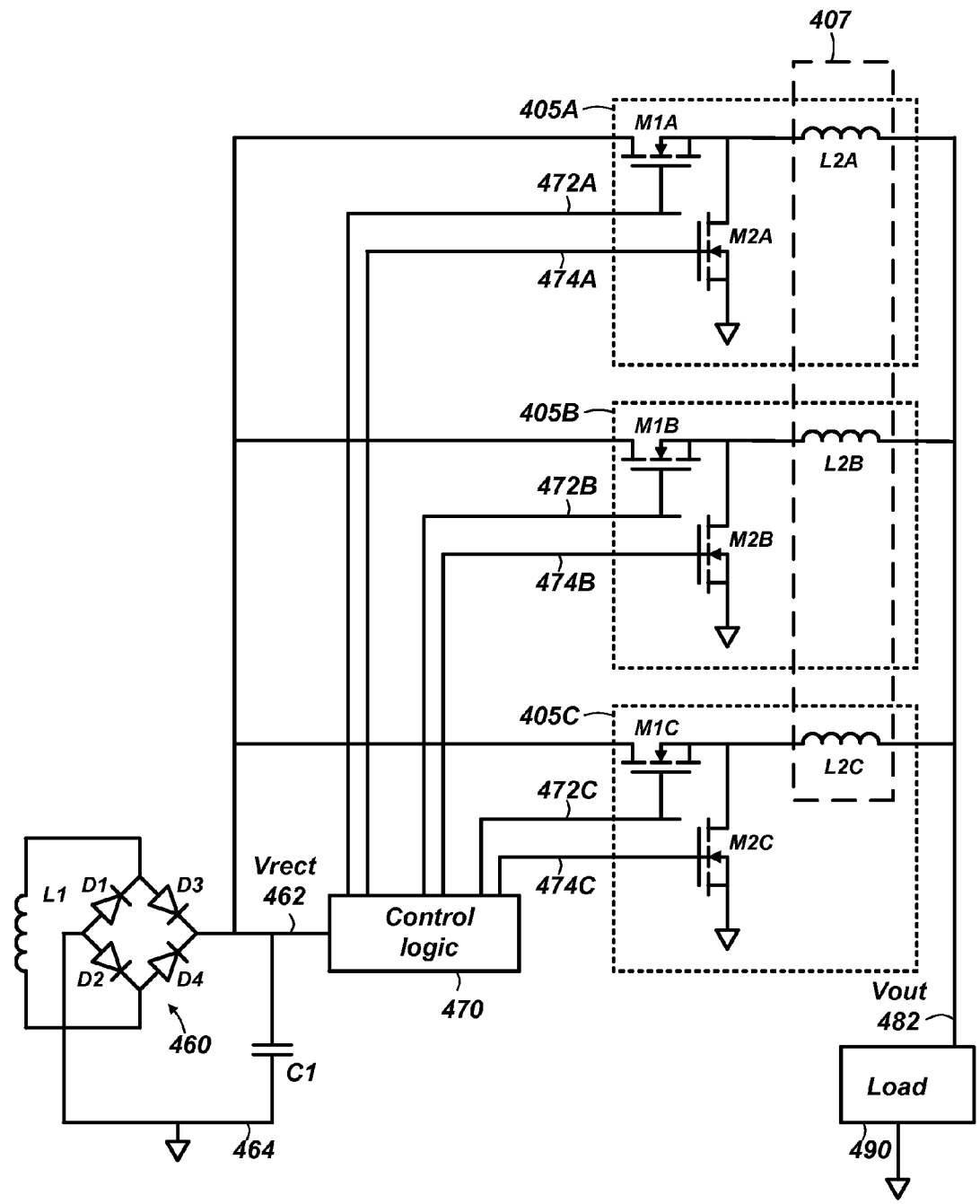
FIG. 4 is a detailed schematic block diagram illustrating a wireless power receiver in another configuration including coupled inductors.

FIG. 4 is a schematic block diagram illustrating a wireless power receiver in another configuration including coupled inductors. In the embodiment of FIG. 4, the tightly coupled windings 407 include inductors L2A, L2B, and L2C. The switched inductor circuits (405A, 405B, 405C) each include the inductors (L2A, L2B, L2C) coupled with a switching circuit including two transistors configured in a buck regulator configuration. Thus, a first switched inductor circuit 405A includes transistor M1A controlled by control signal 472A, transistor M2A controlled by control signal 474A, and inductor L2A. Similarly, a second switched inductor circuit 405B includes transistor M1B controlled by control signal 472B, transistor M2B controlled by control signal 474B, and inductor L2B. Finally, a third switched inductor circuit 405C includes transistor M1C controlled by control signal 472C, transistor M2C controlled by control signal 474C, and inductor L2C. As with the embodiment of FIG. 3, while a 3 phase system is shown in the embodiment of FIG. 4, it is contemplated that any reasonable number of N phase systems with N different switched inductor circuits are included in embodiments of the disclosure.

The wireless power receiver also include a receive coil L1 coupled to a rectifier 460. The rectifier 460 is illustrated with diodes D1, D2, D3, D4. However, the rectifier 460 may also be configured with switches, transistors, or other suitable devices and circuits to perform the rectifying function to create a DC rectified power signal 462 and a rectified ground 464. A filter capacitor C1 may be included to filter variations in the DC rectified power signal 462.

The wireless power receiver also includes control logic 470 configured to provide the control signals (472A, 474A, 472B, 474B, 472C, and 474C) to control the various transistors (M1A, M2A, M1B, M2B, M1C, M2C) to perform the buck regulator functions as well as control a three phase system wherein the phases combine to define a switching period. The discussion of this example assumes equal phases (e.g., each phase is one-third of the switching period in a three phase system). However, in some embodiments phases may not be equal. For example, the number of phases may be varied and embodiments may also be used with different phase times for the different phases. Moreover, the different phase times may be modified to set a voltage for an output power signal 482 with a voltage suitable for driving a load 490 of an electronic device (not shown). In some embodiments, an additional regulator (not show) may be included to modify the voltage and provide power to the load 390 with a different output voltage.

In this example, the control logic 470 controls the switched inductor circuits (405A, 405B, 405C) such that the DC rectified power signal 462 is about 3/1 (3×) or 3/2 (1.5×) of the output voltage 482. Moreover, the control logic 470 controls the switched inductor circuits (405A, 405B, and 405C) such that the output voltage 482 can be set for constant current charging of an output battery (not shown) and power delivery to the load 490 using relatively small output inductances without the nominal output ripple penalty associated with small inductances.

The inductor switching characteristics for each of the three phases to control an energy storage mode and an energy transfer mode for each of the three switched inductor circuits (405A, 405B, 405C) is similar to that described above for the configuration illustrated in FIG. 3 and need not be repeated again.

Referring to both FIGS. 3 and 4, the control logic (370, 470) may be implemented within a processor (e.g., microcontroller) or other circuitry that is configured (e.g., programmed) to perform various operations of embodiments of the present disclosure. The control logic (370, 470) may further include computer-readable media (e.g., memory) storing computing instructions for execution by the processor related to performing processes of the embodiments of the present disclosure. Memory may include volatile and non-volatile memory. In addition, the control logic (370, 470) may further control other functions of the wireless power receive 240, such as controls related to foreign object detection, device operation, etc. The control logic 370 may include different sub-blocks that perform one or more of the above functions separately rather than by employing within a single process, routine, program, etc. In addition, the control logic (370, 470) may each employ different hardware elements for different functions or analog control.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power receiver, comprising:
one or more receive coils configured to generate an AC power signal responsive to a wireless power signal;
two or more inductors configured with tightly coupled windings that share a common leakage inductance;
two or more switching circuits, each switching circuit operably coupled to a corresponding one of the two or more inductors; and
control logic configured to operate switches of the two or more switching circuits such that each of the two or more switching circuits and its corresponding one of the two or more inductors are operated to shift between an energy storage mode for one or more phases of a switching period and an energy transfer mode for other phases of the switching period and the phases combine to comprise an entirety of the switching period;
wherein a pattern of the one or more energy storage mode phases and the one or more energy transfer mode phases for each of the two or more switching circuits and its corresponding one of the two or more inductors during the switching period is different from patterns of the one or more energy storage mode phases and the one or more energy transfer mode phases of others of the two or more switching circuits and their one of the two or more inductors during the switching period.

2. The wireless power receiver of claim 1, wherein:
the one or more receive coils comprise three receive coils;
the two or more inductors comprise three inductors; and
three combined coils are formed wherein each combined coil comprises one of the three receive coils and one of the three inductors such that the three combined coils are configured with the tightly coupled windings that share the common leakage inductance.

3. The wireless power receiver of claim 1, wherein:
the two or more inductors comprise N inductors, wherein N is a positive integer; the two or more switching circuits comprise N switching circuits; and
the control logic is configured to operate the N switching circuits for each of the N inductors such that the energy storage mode is enabled for about 1/N of the switching period.

4. The wireless power receiver of claim 1, wherein:
the two or more inductors comprise N inductors, wherein N is a positive integer; the two or more switching circuits comprise N switching circuits; and
the control logic is configured to operate the N switching circuits for each of the N inductors such that the energy storage mode is enabled for about (1−1/N) of the switching period.

5. The wireless power receiver of claim 1, wherein:
the one or more receive coils comprise a same number of coils as a number of the two or more inductors; and
the two or more switching circuits each comprise four transistors in a bridge configuration operated to perform an AC-DC rectifying function during the one or more phases of the switching period for that switched inductor circuit.

6. The wireless power receiver of claim 5, wherein:
the two or more inductors comprise N inductors, wherein N is a positive integer; the two or more switching circuits comprise N switching circuits; and
the control logic is configured to operate the N switching circuits for each of the N inductors such that the energy transfer mode is enabled for about (1−1/N) of the switching period.

7. The wireless power receiver of claim 1, further comprising a rectifier operably coupled to the one or more receive coils and configured to rectify an AC signal from the one or more receive coils to a DC rectified power signal and wherein:
the two or more switching circuits are coupled in parallel such that each comprise two switches in a buck regulator configuration operably coupled between the DC rectified power signal and a first side of a corresponding inductor of the two or more inductors;
second sides of each inductor of the two or more inductors are coupled together as an output power signal; and
the control logic is configured to control the two switches to perform a buck regulator function during the one or more phases of the switching period for its corresponding inductor.

8. The wireless power receiver of claim 7, wherein:
the two or more inductors comprise N inductors, wherein N is a positive integer; the two or more switching circuits comprise N switching circuits; and
the control logic is configured to operate the N switching circuits for each of the N inductors such that the energy transfer mode is enabled for about (1−1/N) of the switching period.

9. A wireless power enabled apparatus, comprising:
a wireless power receiver, including:
one or more receive coils configured to generate an AC power signal responsive to a wireless power signal;
two or more switched inductor circuits operably coupled to the one or more receive coils, each switched inductor circuit comprising:
an inductor; and
two or more switches operably coupled to the inductor; and
control logic configured to operate the two or more switches such that the two or more switches and the inductor are operated to shift between an energy storage mode for one or more phases of a switching period and an energy transfer mode for other phases of the switching period and the phases combine to comprise an entirety of the switching period;
wherein the inductors from each of the two or more switched inductor circuits include tightly coupled windings that share a common leakage inductance;
wherein a pattern of the one or more energy storage mode phases and the one or more energy transfer mode phases for each of the two or more switching circuits and its corresponding one of the two or more inductors during the switching period is different from patterns of the one or more energy storage mode phases and the one or more energy transfer mode phases of others of the two or more switching circuits and their one of the two or more inductors during the switching period.

10. The wireless power receiver of claim 9, wherein:
the one or more receive coils comprise three receive coils;
the two or more inductor circuits comprise three inductors; and
three combined coils are formed wherein each combined coil comprises one of the three receive coils and one of the three inductors such that the three combined coils are configured with the tightly coupled windings that share the common leakage inductance.

11. The wireless power enabled apparatus of claim 9, wherein the two or more switched inductor circuits comprises N switched inductor circuits and the control logic is configured to operate the two or more switches for each of the N switched inductor circuits such that the energy storage mode is enabled for about 1/N of the switching period, wherein N is a positive integer.

12. The wireless power enabled apparatus of claim 9, wherein the two or more switched inductor circuits comprises N switched inductor circuits and the control logic is configured to operate the two or more switches such that the energy storage mode is enabled for about (1−1/N) of the switching period, wherein N is a positive integer.

13. The wireless power enabled apparatus of claim 9, wherein:
the one or more receive coils comprise a same number of coils as a number of the two or more switched inductor circuits; and
the two or more switched inductor circuits each comprise:
the inductor operably coupled in series with a corresponding one of the one or more receive coils; and
the two or more switches comprise four transistors in a bridge configuration and enabled to perform an AC- DC rectifying function during the one or more phases of the switching period for that switched inductor circuit.

14. The wireless power enabled apparatus of claim 13, wherein:
the one or more receive coils comprise three receive coils;
the two or more switched inductor circuits comprises N switched inductor circuits, wherein N is a positive integer; and
the control logic is configured to control the two or more switches such that the energy transfer mode is enabled for about (1−1/N) of the switching period.

15. The wireless power enabled apparatus of claim 9, further comprising a rectifier operably coupled to the one or more receive coils and configured to rectify an AC signal from the one or more receive coils to a DC rectified power signal and wherein:
the two or more switched inductor circuits are coupled in parallel such that each comprise:
the two or more switches as two switches in a buck regulator configuration operably coupled between the DC rectified power signal and a first side of the inductor; and
a second side of the inductor from each of the two or more switched inductor circuits are coupled together as an output power signal; and
the control logic is configured to control the two switches to perform a buck regulator function during the one or more phases of the switching period for its corresponding inductor.

16. The wireless power enabled apparatus of claim 15, wherein:
the one or more receive coils comprise three receive coils;
the two or more switched inductor circuits comprises N switched inductor circuits, wherein N is a positive integer; and
the control logic is configured to operate the two switches such that the energy transfer mode is enabled for about (1−1/N) of the switching period.

17. A method of operating a receiver side of a wireless power transfer system, the method comprising:
generating an AC power signal responsive to a wireless power signal exciting one or more receive coils at a given frequency; and
operating each of two or more switched inductor circuits operably coupled to the one or more receive coils to shift between an energy storage mode for one or more phases of a switching period and an energy transfer mode for other phases of the switching period and the phases combine to comprise an entirety of the switching period;
wherein the inductors from each of the two or more switched inductor circuits include tightly coupled windings that share a common leakage inductance;
wherein a pattern of the one or more energy storage mode phases and the one or more energy transfer mode phases for each of the two or more switching circuits and its corresponding one of the two or more inductors during the switching period is different from patterns of the one or more energy storage mode phases and the one or more energy transfer mode phases of others of the two or more switching circuits and their one of the two or more inductors during the switching period.

18. The method of claim 17, wherein operating each of the two or more switched inductor circuits comprises operating each of N switched inductor circuits such that the energy storage mode is enabled for about 1/N of the switching period, wherein N is a positive integer.

19. The method of claim 17, wherein operating each of the two or more switched inductor circuits comprises operating each of N switched inductor circuits such that the energy storage mode is enabled for about (1−1/N) of the switching period.

20. The method of claim 17, wherein:
generating the AC power signal is responsive to the wireless power signal exciting N receive coils; and
operating each of the two or more switched inductor circuits comprises operating N switched inductor circuits wherein each of the N switched inductor is operated for the one or more corresponding phases of the switching period by:
coupling the inductor in series with a corresponding one of the N receive coils; and
performing an AC-DC rectifying function with the two or more switches configured as four transistors in a bridge configuration.

21. The method of claim 20, wherein:
generating the AC power signal is responsive to the wireless power signal exciting three receive coils; and
operating each of the two or more switched inductor circuits comprises operating each of N switched inductor circuits such that the energy transfer mode is enabled for about (1−1/N) of the switching period.

22. The method of claim 17, further comprising:
rectifying the AC power signal from the one or more receive coils to a DC rectified power signal; and
operating each of the two or more switched inductor circuits comprises operating N switched inductor circuits, wherein N is a positive integer, and wherein the N switched inductor circuits are coupled in parallel and each of the N switched inductor circuits is operated for the one or more corresponding phases of the switching period by:
regulating the DC rectified power signal with a buck regulator operation using the two or more switches in combination with the inductor; and
coupling a second side of the inductor from each of the two or more switched inductor circuits together as an output power signal.

23. The method of claim 22, wherein:
generating the AC power signal is responsive to the wireless power signal exciting three receive coils; and
operating each of the two or more switched inductor circuits comprises operating each of N switched inductor circuits such that the energy transfer mode is enabled for about (1−1/N) of the switching period.

* * * * *